May 2, 1950　　　　W. WRIGLEY　　　　2,505,819
PANORAMIC SEXTANT HAVING STABILIZED RETICLE
Filed July 26, 1945
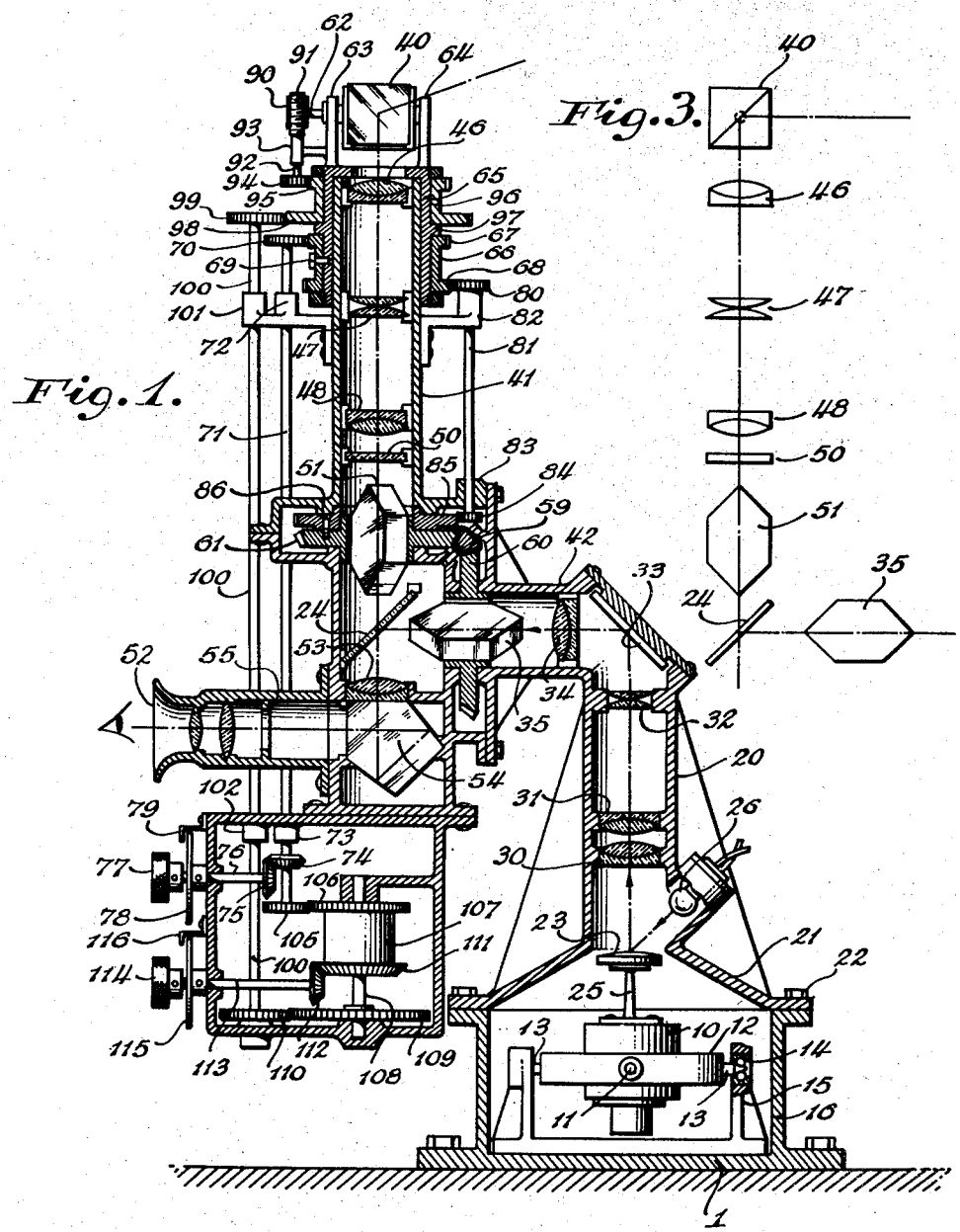
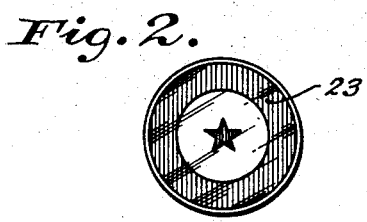
INVENTOR
WALTER WRIGLEY
BY Herbert H. Thompson
　　　　ATTORNEY.

Patented May 2, 1950

2,505,819

UNITED STATES PATENT OFFICE 2,505,819

PANORAMIC SEXTANT HAVING STABILIZED RETICLE

Walter Wrigley, East Hempstead, N. Y., assignor to The Sperry Corporation, a corporation of Delaware Application July 26, 1945, Serial No. 607,139

6 Claims. (Cl. 88—2.7)

This invention relates to an observation instrument having a stabilized reticle.

An object of the invention is the provision of an instrument having an optical system including a stationary eyepiece through which substantially an entire hemisphere may be scanned with reference to a stabilized reticle.

Another object of the invention is the provision of an instrument for observation purposes provided with an optical system including a gyro-stabilized reticle, the elements of the optical system being arranged in a novel manner which makes possible the mounting of both the gyroscope structure and the eyepiece of the optical system in a fixed position with reference to the support on which the instrument is mounted.

Another object of the invention is to provide an observation instrument which requires less space than former instruments. The stationary eyepiece provides a more comfortable arrangement for the observer, and since the eyepiece does not have to be turned while scanning, the instrument may be mounted over a desk or table close to the wall of a cabin.

As the gyroscope structure does not turn with the optical elements, it may be mounted directly upon the instrument support instead of being supported for rotation by the tube containing the optical elements as has been done heretofore. This arrangement simplifies the tube construction considerably and at the same time eliminates any error caused by the rotation of the gyroscope structure while scanning.

When a gyro vertical is used on an airplane, acceleration forces other than the force of gravity act on the erecting mechanism thereof, and whenever there is a change of direction, or magnitude of the resultant force acting on the erecting system, the axis of rotation tends to become displaced in accordance with the resultant force thereby introducing errors whereby the gyroscope does not indicate the true vertical. Stabilizing gyroscopes fixed to the telescope tubes of former observation instruments and rotatable therewith while scanning are subject to this type of error, and, accordingly, one object of the present invention is to provide a more accurate instrument wherein the gyro vertical is mounted in a fixed position and therefore is not subject to acceleration forces due to turning of the sextant while scanning.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects of the invention will be found in the following description given with the aid of the accompanying drawings which show a panoramic sextant constructed in accordance with a preferred form of the invention.

In the drawings,

Fig. 1 is a view of a panoramic sextant partly in section, showing the arrangement of the optical elements and gyroscope;

Fig. 2 shows a reticle; and

Fig. 3 is a diagram of an optical system.

Referring to Fig. 1, a vertical gyroscope of any suitable type is disposed within gyroscope casing 10 supported in the usual manner by pivots 11 in a gimbal ring 12. The gimbal ring is held by pivots 13 which turn in bearings 14 in a support 15 disposed within housing 16.

It will be understood that the tubes for the optical system may be constructed and supported in any suitable manner. In the present embodiment, the optical structure is supported by the housing 16 which encloses the gyroscope structure.

A tube 20 having a flared base 21 fastened by screws 22 to the top of housing supports a series of optical elements by which the light rays forming the image of a reticle 23 are transmitted to a transparent reflecting member 24. The reticle 23 is supported by a spindle 25 mounted on the gyroscope casing 10 in alignment with the spin axis of the gyroscope and is illuminated by a light bulb 26. The optical system preferably comprises a collimator lens 30 which projects as parallel rays the image of the reticle into a unit power periscope consisting of an objective lens 31, a field collector 32, a mirror 33, arranged to deflect the rays in a horizontal direction through an objective lens 34 and a prism 35 to the transparent reflector 24 which reflects the rays toward an eyepiece 52. The prism is supported for rotation as will be described. Prism 35 preferably is a double dove prism and is for the purpose of transmitting an erected image to transparent reflecting member 24.

The optical scanning arrangement, shown diagrammatically in Fig. 3, includes an entrance prism 40 rotatable about intersecting horizontal and vertical axes. The light rays forming the image of the selected celestial body are reflected by the prism to reflector 24 by means of an optical system including a unit power telescope disposed within a stationary vertical telescope tube 41 supported by horizontal tube 42 enclosing part of the optical system for the reticle. The unit power telescope comprises an objective lens 46, a field collector 47, and an objective 48.

A filter member 50 is removably mounted in the telescope tube between objective lens 48 and an erecting prism 51. Prism 51 is shown as a double dove prism similar to prism 35. The double dove arrangement permits the use of a shorter prism and thus the optical system may be made more compact. Prism 51 and reflector 24 transmit the light rays forming the image of the celestial body toward stationary eyepiece 52. The light beams of the reticle and celestial body pass through objective lens 53 to a pentaprism 54, the latter serving to re-erect and bring into coincidence the images and reflect the same at an angle through field stop 55 to the eyepiece.

In the present embodiment of the invention, the dove prisms 35 and 51 are shown as being supported for rotation in the same direction by being mounted within bevel gears 60 and 61, respectively, which are connected by idler gear 59. These gears are rotated at one-half the rate of prism 40 in azimuth by a mechanism which will now be described.

Prism 40 is supported for rotation about a horizontal axis by a shaft 62 which turns in bearings formed in spaced upright members 63 and 64 secured to the upper end of a sleeve 65 rotatably mounted on stationary tube 41. The mechanism for actuating shaft 62 will be described further on. A ring 66 provided with annular gears 67 and 68 is secured by screws 69 to sleeve 65. The ring 66 and sleeve 65 are rotated about a vertical axis to turn prism 40 in azimuth by a gear 70 meshing with gear 67. Gear 70 is fixed to a shaft 71 supported in bearings 72 and 73 attached to stationary tube 41. Shaft 71 is turned by meshed bevel gears 74 and 75, the latter being fixed on shaft 76 to which are attached knob 77 and a suitably calibrated azimuth dial 78 which cooperates with stationary index 79.

Annular gear 68 meshes with gear 80 on shaft 81 which turns in bearing supports 82 and 83 attached to tube 41. Gear 84 at the lower end of shaft 81 meshes with an annular gear 85 attached by screws 86 to bevel gear 61 to turn prism 51. Gears 85, 59 and 61 are provided with suitable bearings in the stationary structure which supports the optical system. The gear ratio is such that when knob 77 is actuated, prism 51 and also prism 35 are driven by shaft 81 at one-half of the angular rate of prisms 40 in azimuth.

Shaft 62 is turned to rotate prism 40 about a horizontal axis. The shaft has a gear 90 fixed thereto meshing with a worm 91 on shaft 92 that turns in a bearing in a support 93 attached to supporting member 63. Shaft 92 also carries a gear 94 which meshes with an annular gear 95 formed on ring 96, the latter being free to turn on sleeve 65. Ring 96 is spaced from ring 66 by a washer 97. Ring 96 has a second annular gear 98 formed thereon in mesh with gear 99 fixed on shaft 100 which turns in bearings in supports 101 and 102 attached to stationary tube 41.

In the apparatus described thus far, relative movement of ring 96 and sleeve 65 on which prism 40 is mounted, due to operation of the azimuth knob 77, will cause rotation of prism 40 about the axis of horizontal shaft 62 also. In order to maintain the angular position of prism 40 constant about its horizontal axis when it is rotated about its vertical axis by the azimuth knob, azimuth shaft 71 is coupled by gear 105 to one input gear 106 of a compensating differential 107. The output shaft 108 of the differential is connected by gears 109 and 110 to elevation shaft 100. A second input gear 111 of the differential in mesh with gear 112 on shaft 113 is operated by elevation knob 114 secured to the shaft. Shaft 113 actuates a suitably calibrated elevation dial 115 cooperating with stationary index 116. The ratios of the differential and associated gears are such that shaft 100 is turned one way or the other when the azimuth knob is operated to effect such relative movement of ring 96 and sleeve 65 on which prism 40 is mounted as to maintain unchanged the angular position of prism 40 on its horizontal axis.

When knob 114 is turned, it drives through the differential to turn shafts 108 and 100, and the gears and shafts already described as being actuated by shaft 100, to effect the desired rotation of prism 40 about the axis of shaft 62. Operation of knob 114 has no effect on azimuth shaft 71 which moves only when azimuth knob 77 is displaced.

The various optical elements function in a manner well known to those skilled in the art. The optical system is so proportioned that the effect of movements of the aircraft about its longitudinal and transverse axes are neutralized; that is, the image of the celestial body does not appear to change its position when once superimposed upon the image of the stabilized reticle, because the optical system disclosed is effective to shift the image of the reticle in the same direction and by an amount equal to the shifting of the celestial image caused by tilting of the instrument.

The celestial image is centered in the reticle by adjusting knobs 77 and 114. The reticle, being stabilized parallel to the earth, serves as an artificial horizon, and the angular position of the body being observed may be read from dials 78 and 115.

Dove prism 35 keeps the center of the reticle image fixed on the center of the image formed by rays of light from the celestial object irrespective of roll and pitch of the airplane. When knob 77 is adjusted, the reticle image will appear to rotate about its center due to rotation of dove prism 35. For this reason reticle 23 is preferably circular as shown in plan view in Fig. 2 in order to prevent the apparent rotary movement thereof from confusing the observer.

The image formed by light rays from the celestial body is reversed, as is well known, when transmitted by entrance prism 40. The double dove prism 51 erects this image and the transparent reflecting member 24 transmits the same to pentaprism 54 where it may be brought into coincidence with the image of the reticle by suitably adjusting knobs 77 and 114. Pentaprism 53 transmits this image in a horizontal direction so that it may be observed erect from the eyepiece. With the arrangement described, the image of the target or celestial body and reticle is stabilized in a panoramic sense, that is, up and down and transverse movements are seen through the eyepiece in the appropriate direction.

The form of the invention here shown is illustrative only, and it will be understood that various modifications thereof will suggest themselves to those skilled in the art without departing from the spirit of the invention or the scope of the appended claims.

What is claimed is:

1. In a panoramic sextant adapted for permanent installation, a stationary eyepiece, an optical system for panoramic scanning including the stationary eyepiece, and an entrance prism angularly movable about elevation and azimuth axes according to the position of an observed object, a stationary transparent reflecting member, a rotatable dove prism cooperating with the entrance prism for transmitting light rays from an observed object to the transparent reflecting member which transmits said rays toward the eyepiece, an illuminated reticle, a gyro for stabilizing the reticle, a stationary mounting for the gyro, a second optical system including a rotatable dove prism for transmitting light rays from the reticle to the transparent reflecting member which reflects the latter rays toward the eyepiece where they may be viewed in coincidence with the light rays from the object, and a train of mechanism including gearing coupling both dove prisms with the entrance prism effective to rotate the dove prisms at one half the rate of the entrance prism when the entrance prism is displaced in azimuth in order that erect images may be observed from the eyepiece.

2. In a panoramic sextant adapted for permanent installation, a stationary eyepiece, an optical system for panoramic scanning including the stationary eyepiece, and an entrance prism movable angularly about elevation and azimuth axes according to the position of an observed object, a stationary transparent reflecting member, a rotatable dove prism cooperating with the entrance prism for transmitting light rays from an observed object through the transparent reflecting member toward the eyepiece, an illuminated reticle, a gyro for stabilizing the reticle, a stationary mounting for the gyro, a second optical system including a rotatable dove prism for transmitting light rays from the reticle to the reflecting member which reflects them toward the eyepiece where they may be observed in coincidence with the light rays from the observed object, a train of mechanism including gearing coupling the dove prisms with the entrance prism effective to rotate the dove prisms at one-half of the angular rate of the entrance prism when the entrance prism is displaced in azimuth in order that erect images may be observed from the eyepiece, and an actuating knob for the mechanism disposed adjacent the eyepiece.

3. In a panoramic sextant adapted for permanent installation, an optical system for panoramic scanning including an entrance prism angularly movable about elevation and azimuth axes, a stationary transparent reflecting member, a rotatable dove prism cooperating with the entrance prism for transmitting light rays from an observed object, an illuminated reticle, a gyro for stabilizing the reticle, a stationary mounting for the gyro, a second optical system including a rotatable dove prism for transmitting light rays from the reticle to the reflecting member which reflects the latter rays in the same direction as those from the observed object, a train of mechanism including gearing coupling the dove prisms with the entrance prism effective to rotate the dove prisms at one-half the angular rate of the entrance prism when the entrance prism is displaced in azimuth, a stationary eyepiece for the sextant and a further optical system including a pentaprism cooperating with the eyepiece and with the reflecting member through which erect images of the object and reticle may be observed.

4. A panoramic sextant adapted for permanent installation comprising an entrance prism supported for displacement about elevation and azimuth axes, an illuminated reticle for providing a horizontal reference therefor, a vertical gyroscope disposed in a relatively stationary support for stabilizing the reticle against rolling and pitching movements of the supporting craft, the stationary support being provided for the purpose of eliminating substantially the effect of variable acceleration forces to which the gyroscope would otherwise be subject, separate angularly displaced optical systems for the entrance prism and reticle including a stationary transparent reflecting member common to both systems for reflecting rays of light from one of the systems and transmitting rays of light from the other along a common axis, a stationary eyepiece having optical means associated therewith for viewing images formed by the rays of light transmitted along said axis, a rotatable dove prism in each of the optical systems arranged to maintain erect the images viewed by the eyepiece, and mechanical connections coupling the dove prisms with the entrance prism for rotating the dove prisms at one-half the angular rate of the entrance prism when the latter is displaced about its azimuth axis.

5. A panoramic sextant adapted for permanent installation comprising an entrance prism supported for displacement about elevation and azimuth axes, an illuminated reticle for providing a horizontal reference therefor, a gyro vertical having a relatively stationary mounting for stabilizing the reticle against rolling and pitching movements of the supporting craft, the stationary support being provided for the purpose of eliminating substantially the effect of variable acceleration forces which would affect the operation of the gyro if otherwise mounted, separate angularly displaced optical systems for the reticle and entrance prism, a stationary reflecting member for reflecting rays of light from one of the optical systems along the same axis as those from the other system, a stationary eyepiece having an optical system for viewing images transmitted along said axis, a rotatable dove prism in each of the optical systems arranged to provide erect images of the reticle and objects viewed through the entrance prism for the eyepiece and a mechanism having a knob mounted adjacent the eyepiece coupled with the entrance prism and dove prisms for rotating the entrance prism about its azimuth axis and the dove prisms at half the angular rate thereof for the purpose of maintaining erect the images observed through the eyepiece.

6. A panoramic sextant adapted for permanent installation comprising an entrance prism supported for displacement about elevation and azimuth axes, an illuminated reticle therefor, a gyro vertical having a relatively stationary mounting for stabilizing the reticle against rolling and pitching movements of a supporting craft, the stationary mounting being for the purpose of eliminating substantially the effect of variable acceleration forces to which the gyro would otherwise be subject, a stationary eyepiece, separate optical systems for the entrance prism and reticle including a transparent reflecting member common to both systems for transmitting rays of light from one system and reflecting rays of light from the other along a common axis toward the eyepiece, a rotatable dove prism for each optical system arranged to provide erect images of the reticle and the objects viewed through the entrance prism for the eyepiece, separate knob means located near the eyepiece for adjusting the angular position of the entrance prism to bring the image of an observed object into coincidence with the image of the reticle, and means coupled with the entrance prism for turning the dove prisms through half the angular displacement of the entrance prism in azimuth to provide erect images for the eyepiece irrespective of changing angular position of the entrance prism.

WALTER WRIGLEY.

REFERENCES CITED

The following references are of record in the file of this patent:

UNITED STATES PATENTS

| Number | Name | Date |
|---|---|---|
| 1,299,459 | Griffith | Apr. 8, 1919 |
| 2,266,741 | Crane et al. | Dec. 23, 1941 |
| 2,389,142 | Esval et al. | Nov. 20, 1945 |

FOREIGN PATENTS

| Number | Country | Date |
|---|---|---|
| 265,222 | Germany | Oct. 6, 1913 |
| 703,756 | Germany | Mar. 15, 1941 |